Aug. 24, 1926.
H. P. BRUNAUGH
1,596,867
FORTUNE TELLING DEVICE FOR SCALES
Filed August 4, 1924
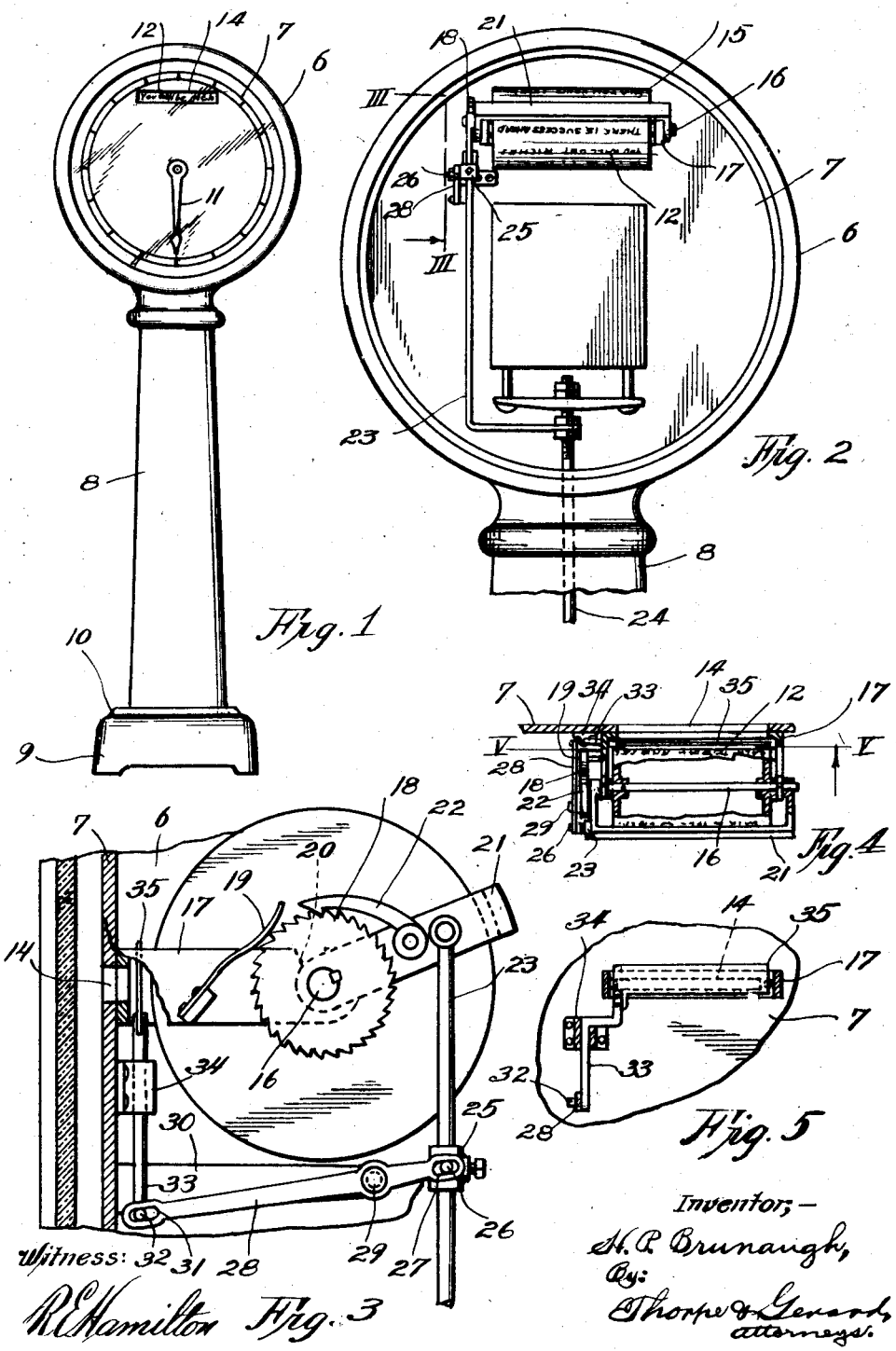

Patented Aug. 24, 1926.

1,596,867

UNITED STATES PATENT OFFICE.

HARRY P. BRUNAUGH, OF KANSAS CITY, MISSOURI, ASSIGNOR TO JOHN B. WATLING, OF CHICAGO, ILLINOIS.

FORTUNE-TELLING DEVICE FOR SCALES.

Application filed August 4, 1924. Serial No. 730,109.

The present invention relates to weighing scales, and the principal object in view is to devise a fortune-telling mechanism which is of simple form and adapted to be applied to weighing scales of the type now in general use, and with particular reference to scales of the coin-controlled type, with a view to enabling a patron of the scales to ascertain his weight and at the same time obtain a fortune-telling reading by the operation of the improved device.

It is further sought to provide a device of this character particularly adapted for installation in a platform weighing scale, the dial of which is provided with an opening or window for the display of fortune-telling indicia, with which opening or window is also associated a shutter device maintained normally in closed relation, but adapted to be actuated automatically to open position for exposing to view the fortune-telling indicia as often as the scale is operated.

With this general object in view, the invention will now be described with reference to the accompanying drawing illustrating one form of construction which has been devised for embodying the proposed improvements, after which those features deemed to be novel will be particularly set forth and claimed.

In the drawing—

Figure 1 is an elevation, illustrating a scale embodying the present invention;

Figure 2 is an enlarged sectional elevation, illustrating the interior of the head portion of the machine, and exposing the rear face of the dial, and the operative position of the improved fortune-telling device and its connection to the scale operating rod;

Figure 3 is an enlarged vertical sectional view, partly broken away, and illustrating a section on the line III—III of Figure 2;

Figure 4 is a horizontal sectional detail view showing a portion of the scale dial and the window or opening therein for exposing the fortune-telling readings, and illustrating the parts of the improved device adjacent to said opening; and Figure 5 is a fragmentary sectional view, illustrating a section on the line V—V of Figure 4.

Referring now to the drawing in detail, this illustrates a weighing scale of the platform type comprising the usual head portion 6 with its dial 7, the column 8 supporting the head portion 6, and the base portion 9 with the usual platform 10. The details of the weighing mechanism for operating the index 11 are not illustrated, the present invention residing solely in the fortune-telling mechanism for displaying fortune-telling indicia or readings 12 through an opening or window 14 in the dial 7 in response to each operation of the weighing mechanism.

Accordingly, I provide a drum member 15, which is rotatively mounted on a shaft 16 journaled for free rotative movement within a suitable bracket 17, which is preferably secured to the rear face of the dial 17, as clearly illustrated in Figures 2, 3 and 4. The arrangement of the bracket 17 is such as to consecutively display the readings 12 on the drum 15 through the window or opening 14, these readings 12 being applied to the drum 15 in any desired manner. One end of the shaft 16 has keyed thereto a suitable ratchet wheel 18 engaged by a leaf spring element 19 the purpose of which is to help steady the rotative movement of the drum 15, and also to maintain the shaft 16 in proper position within the open bearing recesses 20 in the arms of the bracket 17. On the ends of the shaft 16 are also journaled the ends of a pawl-carrying yoke 21, one leg of which carries a suitable pawl or ratchet member 22 in engagement with the teeth of the ratchet wheel 18, as clearly illustrated in Figure 3. Adjacent to the pivot of the pawl or ratchet element 22 is pivotally connected to the pawl carrier 21 the upper end of an operating arm 23, the lower end portion of which is bent in a horizontal direction and secured to the upper end portion of the actuating rod 24 of the scale mechanism.

Intermediate its ends, the arm 23 is provided with a set collar or sleeve 25 carrying a pin 26 in engagement with a slot 27 formed in one end of a lever 28 which is fulcrumed, as indicated at 29, to a fixed arm 30 attached to the rear face of the dial 7. The other end of this lever 28 is also formed with a slot 31 in engagement with a lug or pin 32 at the lower end of an arm 33 which is slidingly mounted in a block 34 also attached to the dial 7 adjacent to the arm 30. The upper end of this arm 33 carries a suitable shutter member 35 having dimensions corresponding to the size of the window opening 14, and adapted to be maintained by the described connections with the rod 24, normally in closed relation to said opening 14, as illustrated in Figures 3 and 5.

The operation of the arrangement and construction above described will be readily understood, from the illustration in the drawing, but may be briefly stated as follows. When the patron steps upon the platform 10, the weighing mechanism will be operated in the usual manner, the scale finger 11 automatically registering the weight upon the dial 7. Simultaneously, the lowering of the rod 24 will actuate the arm 23 downwardly, thus causing the ratchet or pawl 22 to impart a partial turn to the ratchet wheel 18, and correspondingly rotate the drum 15 carrying the fortune-telling readings. In practice, a slight turning movement will be imparted to the drum, varying in force with the pressure on the platform 10, so that the degree of rotation of the drum will vary with different pressures on the platform, a quick sharp movement of the rod 24 obviously imparting a more vigorous rotative movement to the drum. Simultaneous with the depression of the arm 23, the arm 33 will be raised to elevate the shutter element 35 above the opening 14, for the proper display of the indicia on the drum 15 which may be opposite the opening 14 when the drum comes to rest. As soon as the patron steps off the platform 10, the parts will automatically be restored to initial position by the usual operation of the return mechanism of the scale, with the exception that the drum 15, of course, remains at rest, the ratchet or pawl 22 simply moving forward over teeth of the wheel 18 without affecting the position of the drum.

What I claim is:

1. In platform weighing scales, in combination with the scale dial and platform-actuated rod, a freely movable member carrying fortune-telling indicia, said dial having an opening for separately exposing the indicia on said member, means connecting said member with said rod for imparting intermittent movement to said member in response to pressure on the platform, and a shutter normally closing said opening and provided with means causing said shutter to move into open position simultaneously with each operative movement of said member.

2. In platform weighing scales, in combination with the scale dial and platform-actuated rod, a freely movable member carrying fortune-telling indicia, said dial having an opening for separately exposing the indicia on said member, means connecting said member with said rod for imparting intermittent movement to said member in response to pressure on the platform, and a shutter normally closing said opening, and means responsive to pressure on the platform for actuating said shutter into open position simultaneously with each operative movement of said member.

3. In platform weighing scales, in combination with the scale dial and platform-actuated rod, a freely rotatable drum carrying fortune-telling indicia, said dial having an opening for separately exposing the indicia on said drum, a shutter normally closing said opening, means connecting said drum with said rod for imparting intermittent rotative movement to said drum in response to pressure on the platform, and means actuated from said rod for moving said shutter into open position simultaneously with each rotative movement of the drum.

In witness whereof I hereunto affix my signature.

HARRY P. BRUNAUGH.